United States Patent
Zhang et al.

(10) Patent No.: US 11,754,666 B2
(45) Date of Patent: Sep. 12, 2023

(54) RADAR DETECTION PRIORITIZATION BASED ON DOWNSTREAM FEEDBACK

(71) Applicant: Aptiv Technologies Limited, St. Michael (BB)

(72) Inventors: Kai Zhang, Carmel, IN (US); Xiaohui Wang, Oak Park, CA (US); James Nicholas Nickolaou, Clarkston, MI (US)

(73) Assignee: Aptiv Technologies Limited, St. Michael (BB)

( * ) Notice: Subject to any disclaimer, the term of this patent is extended or adjusted under 35 U.S.C. 154(b) by 318 days.

(21) Appl. No.: 17/328,845

(22) Filed: May 24, 2021

(65) Prior Publication Data

US 2022/0260670 A1 Aug. 18, 2022

Related U.S. Application Data

(60) Provisional application No. 63/148,973, filed on Feb. 12, 2021.

(51) Int. Cl.
*G01S 7/00* (2006.01)
*G01S 13/931* (2020.01)
*G08G 1/01* (2006.01)

(52) U.S. Cl.
CPC ............ *G01S 7/003* (2013.01); *G01S 13/931* (2013.01); *G08G 1/01* (2013.01); *G01S 2013/9316* (2020.01); *G01S 2013/9322* (2020.01)

(58) Field of Classification Search
CPC .............. G01S 7/003; G01S 13/931; G01S 2013/9322; G01S 2013/9316;

(Continued)

(56) References Cited

U.S. PATENT DOCUMENTS 10,205,457 B1 * 2/2019 Josefsberg .............. H03L 7/091
10,306,430 B1 * 5/2019 Abari ................... G05D 1/0055

(Continued)

FOREIGN PATENT DOCUMENTS

CN 111401208 A 7/2020
DE 102017110808 A1 12/2017

OTHER PUBLICATIONS

"Extended European Search Report", EP Application No. 21212810.2, dated May 11, 2022, 10 pages.

(Continued)

*Primary Examiner* — Peter M Bythrow
(74) *Attorney, Agent, or Firm* — Sawtooth Patent Group PLLC

(57) ABSTRACT

Methods and systems are described that enable radar detection prioritization based on downstream feedback. As a vehicle is traveling in a travel corridor, radar detections are received by a processor and feedback related to a downstream function is received from another processor that is executing the downstream function. For the radar detections that are determined to be within the travel corridor, respective priorities are assigned based on locations of the radar detections and the feedback related to the downstream function. The radar detections with the assigned priorities are then stored in a detection buffer along with indications of their respective assigned priorities. In this way, the detection buffer may be optimized for the downstream function by filtering out certain detections and prioritizing others. Consequently, computational loads on the downstream function are reduced while ensuring that important detections are received by the downstream function early.

20 Claims, 5 Drawing Sheets

(58) Field of Classification Search
CPC ...... G01S 13/937; G01S 13/933; G01S 7/295; G01S 13/52; G08G 1/01
See application file for complete search history.

(56) References Cited

U.S. PATENT DOCUMENTS

| | | | |
|---|---|---|---|
| 10,371,529 B2* | 8/2019 | Roumeliotis | G06V 20/56 |
| 11,037,001 B2* | 6/2021 | Agrawal | G06T 7/174 |
| 11,070,721 B2* | 7/2021 | Agrawal | G06V 20/56 |
| 2004/0167667 A1* | 8/2004 | Goncalves | G05D 1/0272 |
| | | | 700/250 |
| 2010/0253918 A1* | 10/2010 | Seder | G01S 13/867 |
| | | | 353/13 |
| 2015/0293216 A1* | 10/2015 | O'Dea | B60W 40/06 |
| | | | 701/23 |
| 2017/0297568 A1* | 10/2017 | Kentley | B60W 30/09 |
| 2017/0350975 A1* | 12/2017 | Asanuma | G01S 13/931 |
| 2019/0137601 A1* | 5/2019 | Driscoll | G01S 13/424 |
| 2019/0227549 A1* | 7/2019 | Hummelshøj | G06V 10/87 |
| 2020/0158864 A1* | 5/2020 | Achour | H04W 4/40 |
| 2020/0172120 A1* | 6/2020 | Pink | G01S 7/484 |
| 2021/0099643 A1* | 4/2021 | Agrawal | G06T 7/10 |
| 2021/0263145 A1* | 8/2021 | Wang | G01S 13/325 |
| 2021/0264224 A1* | 8/2021 | Tamaoki | G01S 7/411 |
| 2021/0287019 A1* | 9/2021 | Wang | G06T 7/70 |
| 2021/0302570 A1* | 9/2021 | Ichiki | G01S 13/865 |
| 2021/0380106 A1* | 12/2021 | Chinni | B60W 10/20 |
| 2021/0389769 A1* | 12/2021 | Hari | B60W 60/0015 |
| 2022/0001891 A1* | 1/2022 | Xiao | G01C 21/3461 |
| 2022/0017113 A1* | 1/2022 | Han | G05D 1/0246 |
| 2022/0144265 A1* | 5/2022 | Cao | G05D 1/0212 |
| 2022/0260671 A1* | 8/2022 | Chen | G01S 13/867 |
| 2022/0404488 A1* | 12/2022 | Das | G01S 13/66 |

OTHER PUBLICATIONS

Kunz, et al., "Fast Collision Checking with a Frenet Obstacle Grid for Motion Planning", Sep. 28, 2015, pp. 95-104.

* cited by examiner

RADAR DETECTION PRIORITIZATION BASED ON DOWNSTREAM FEEDBACK

CROSS-REFERENCE TO RELATED APPLICATION

This application claims the benefit under 35 U.C.S. 119(e) of U.S. Provisional Application No. 63/148,973, filed Feb. 12, 2021, the disclosure of which is incorporated by reference in its entirety herein.

BACKGROUND

Radar is often used in vehicles to support a variety of driver assist and autonomous driving functionalities. Radar systems that are upstream of these functions produce radar detections from received radar reflections and place the detections within a buffer that is accessed by functions of a vehicle. The downstream functions receive the detections from the buffer and perform their respective operations. Often times, a radar buffer becomes saturated (e.g., full) with detections corresponding to close and large objects. Some of the objects (or portions thereof) may not be of particular importance to downstream functions. As such, the buffer may be full of unimportant detections; certain important detections may not have space within the buffer and, thus, are never processed by the downstream functions. In addition, certain more-meaningful detections may be processed later than they otherwise could be (e.g., because they can only be stored when space becomes available) or simply not be processed at all.

SUMMARY

Aspects described below include a method, performed by a processor of a vehicle, of radar detection prioritization based on downstream feedback. The method includes receiving radar detections as the vehicle is traveling in a travel corridor, the radar detections having associated locations relative to the vehicle. The method further includes receiving, from another processor of the vehicle, feedback related to a downstream function executed by the other processor as the vehicle is traveling in the travel corridor and determining, based on the locations of the radar detections and the feedback related to the downstream function, whether any of the radar detections are within the travel corridor. For at least one of the radar detections that are within the travel corridor, the method also includes assigning a priority to the at least one of the radar detections, the priority being dependent on the locations of the at least one of the radar detections and the feedback related to the downstream function. For the at least one of the radar detections that are within the travel corridor, the method further includes storing, in a detection buffer, the at least one of the radar detections along with an indication of the assigned priority.

Aspects described below also include a system, configured to be implemented in a vehicle, for radar detection prioritization based on downstream feedback. The system comprises a processor and computer-readable storage media comprising instructions that, when executed by the processor, cause the processor to receive radar detections as the vehicle is traveling in a travel corridor. The radar detections having associated locations relative to the vehicle. The instructions further cause the processor to receive, from another processor of the vehicle, feedback related to a downstream function executed by the other processor as the vehicle is traveling in the travel corridor and determine, based on the locations of the radar detections and the feedback related to the downstream function, whether any of the radar detections are within the travel corridor. The instructions also cause the processor to, for at least one of the radar detections that are within the travel corridor, assign a priority to the at least one of the radar detections, the priority being dependent on the locations of the at least one of the radar detections and the feedback related to the downstream function. The instructions further cause the processor to store, in a detection buffer, the at least one of the radar detections along with an indication of the assigned priority.

BRIEF DESCRIPTION OF THE DRAWINGS

Systems and techniques enabling radar detection prioritization based on downstream feedback are described with reference to the following drawings. The same numbers are used throughout the drawings to reference like features and components.

DETAILED DESCRIPTION

Overview

Radar is often used to support a wide variety of driver assist and autonomous driving functions. Many times, radar detections of objects (e.g., radar returns) are placed within a buffer for downstream processing. Downstream functions then pull the detections from the buffer to perform various operations. As long as there is room in the buffer, the detections can be added without issue. When the buffer is full, however, radar systems may wait until space is freed (e.g., detections are pulled by the downstream functions) prior to adding new detections.

This can lead to processing of important detections being delayed or even missed. Because the storing of the detections in the buffer is uninfluenced, the buffer may become full of detections that are not particularly relevant to the downstream operations. For example, the buffer may become saturated with detections of an upcoming bridge even though it may not be relevant to a downstream function (e.g., speed control using a leading vehicle). As such, the buffer may be unable to store detections indicative of slow-moving traffic ahead, which may be more-relevant to the downstream operations than the bridge detections. By not influencing the storage of the detections, processing of important detections may be delayed or simply missed. This can lead to unsafe driving conditions, decreased safety, and diminished driver satisfaction.

Methods and systems are described that enable radar detection prioritization based on downstream feedback. Radar detections are received as a vehicle is traveling in a travel corridor, the radar detections having associated locations relative to the vehicle. Feedback related to a downstream function is received from another processor as the vehicle is traveling in the travel corridor, and it is determined, based on the locations and feedback, whether any of the radar detections are within the travel corridor. For at least one of the radar detections that are within the travel corridor, a priority is assigned based on the locations of the at least one of the radar detections and the feedback related to the downstream function. The at least one of the radar detections are then stored in a detection buffer along with an indication of the assigned priority. In this way, the detection buffer may be optimized for the downstream function by filtering out certain detections and prioritizing others. The downstream function can process detections that matter most for driving safety and situational awareness, without being burdened evaluating less important detections. Consequently, because the downstream function's receipt of important detections is expedited, computational loads on the downstream function are reduced.

Example Environment

Figure 1:
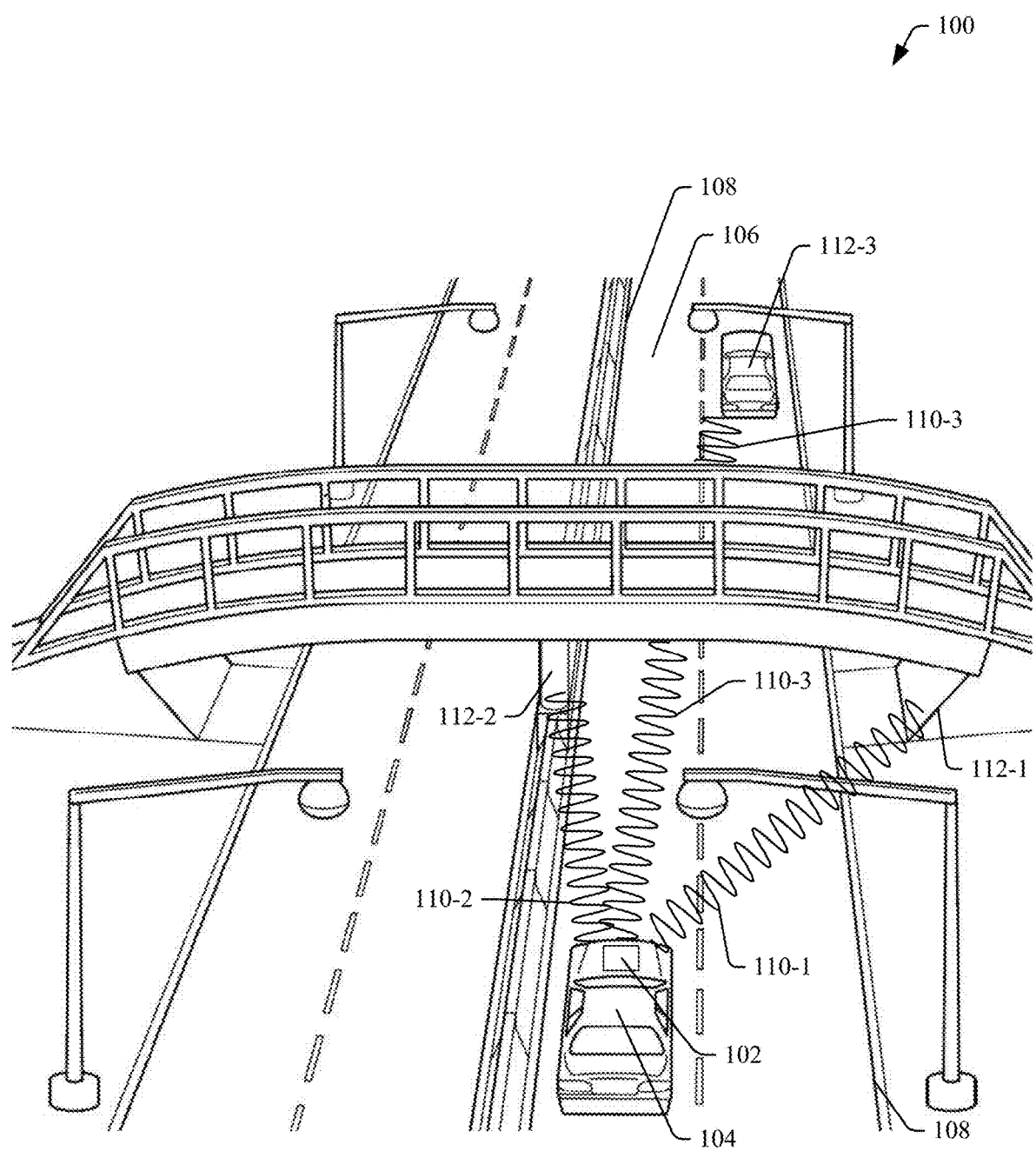
FIG. 1 is an example illustration of an environment in which radar detection prioritization based on downstream feedback may be implemented, in accordance with techniques of this disclosure.

FIG. 1 is an example illustration 100 of an environment in which radar detection prioritization based on downstream feedback may be implemented. The example illustration 100 shows a radar system 102 of a system (not shown) that is within a vehicle 104. The vehicle 104 is traveling in a travel corridor 106 that may correspond to a portion of a roadway that the vehicle 104 is traveling on. For example, the travel corridor 106 may correspond to a portion of the roadway that corresponds to a same direction of travel as the vehicle 104 (e.g., one side of a roadway). The travel corridor 106 may be defined by extents 108 (e.g., barriers, fences, guardrails, or edges of pavement/concrete) on the lateral edges of the travel corridor 106.

As the vehicle 104 traverses through the travel corridor 106, radar detections (detections 110) are received. The detections 110 comprise information, derived from radar reflections, about objects 112 (or portions thereof) proximate to the vehicle 104. For example, detection 110-1 corresponds to object 112-1 (e.g., an overpass support), detection 110-2 corresponds to object 112-2 (e.g., another overpass support), and the detection 110-3 corresponds to object 112-3 (e.g., another vehicle). The detections 110 have associated locations relative to the vehicle 104 and movement information.

It should be noted that the detections 110 are merely representations of the respective objects 112 (or portions thereof). That is, the detections 110 themselves do not have locations or movement data; rather, the corresponding objects 112 do. For the sake of simplicity, detections 110 are used herein. For example, by stating that a detection 110 is moving, it should be understood that an object (or portion thereof) to which the detection 110 corresponds is moving.

The radar system 102 uses feedback received from a downstream function to prioritize the detections 110. For example, the radar system 102 may use the feedback to determine which of the detections 110 are outside of the travel corridor 106. The radar system 102 may then refrain from placing those detections 110 that are outside of the travel corridor 106 into a detection buffer for processing by the downstream function. For the detections 110 that are within the travel corridor 106, the radar system 102 may prioritize the detections 110 and place them within the detection buffer for processing by the downstream function.

For example, in the example illustration 100, by using conventional techniques, the detection buffer may become full or saturated with detections 110-1 and 110-2 corresponding to the overpass because it is large and close to the vehicle. In this case, detection 110-3 corresponding to the other vehicle may not be able to be stored within the detection buffer. In many cases, a detection of a moving object within the travel corridor 106 (the other vehicle) can be more important than a static object outside of the travel corridor 106 (the overpass). Thus, by using the techniques described herein, the detection buffer may be optimized for relevancy (e.g., by not storing the detections 110-1 and 110-2 while storing the detection 110-3) while reducing a computational load on the downstream function. Doing so may enable certain detections 110 to be processed earlier, leading to increased safety and driver satisfaction.

Example System

Figure 2:
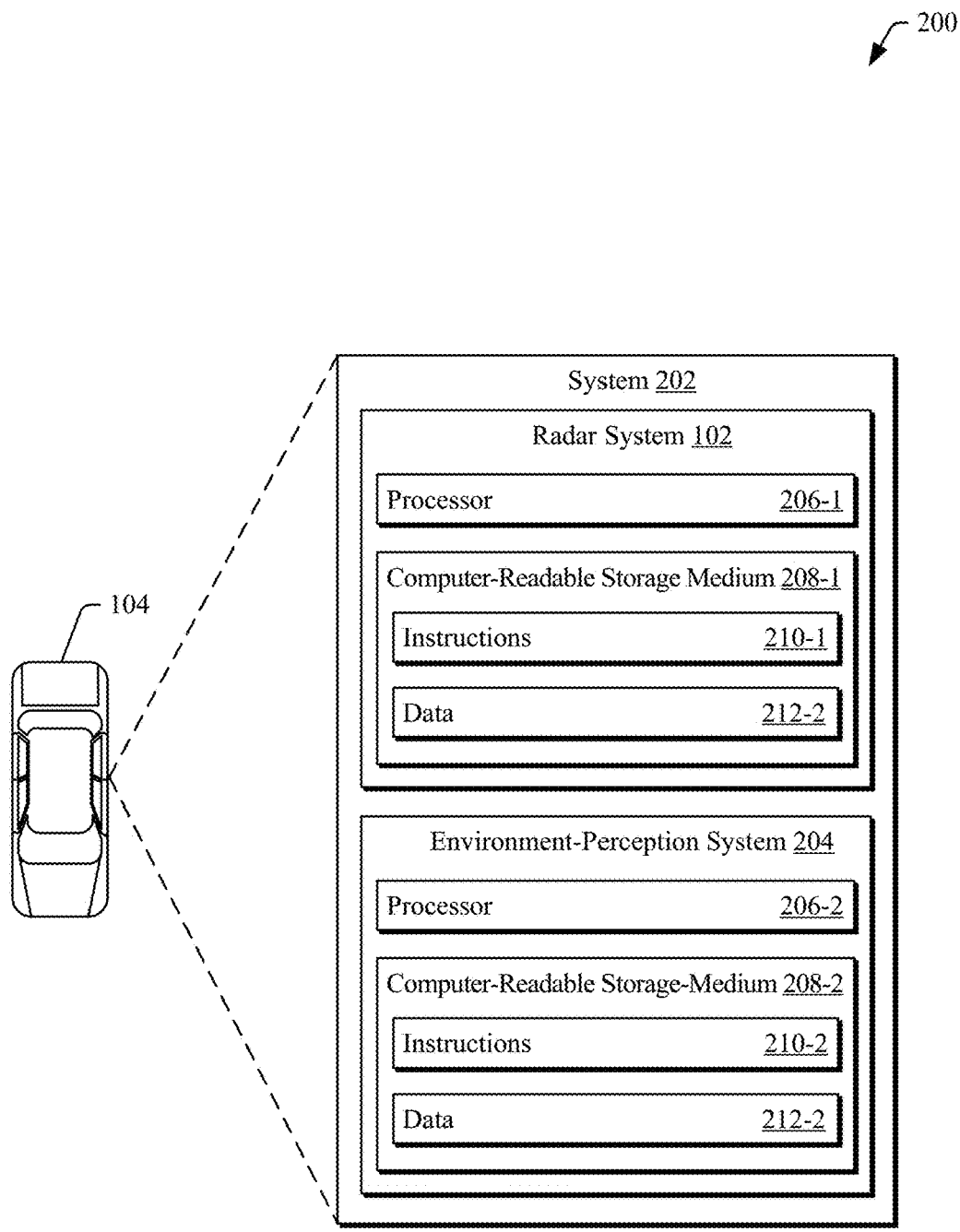
FIG. 2 is an example illustration of a system configured to perform radar detection prioritization based on downstream feedback, in accordance with techniques of this disclosure.

FIG. 2 is an example illustration 200 of a system 202 in which radar detection prioritization based on downstream feedback may be implemented. The system 202 is configured to be disposed in the vehicle 104. Although the vehicle 104 is illustrated as a car, the vehicle 104 may comprise any vehicle (e.g., a truck, a bus, a boat, a plane, etc.) without departing from the scope of this disclosure. As shown underneath, the system 202 includes the radar system 102 and an environment-perception system 204. The radar system 102 and the environment-perception system 204 are shown as having respective processors 206 (e.g., 206-1 and 206-2) and respective computer-readable storage media 208 (e.g., 208-1 and 208-2). In some implementations, the radar system 102 and the environment-perception system 204 may share a processor 206 and/or a computer-readable storage medium 208.

The processors 206 (e.g., application processors, microprocessors, digital-signal processors (DSP), or controllers) execute instructions 210 (e.g., code) stored within the computer-readable storage media 208 (e.g., non-transitory storage devices such as hard drives, SSD, flash memories, read-only memories (ROM), EPROM, or EEPROM) to cause the radar system 102 and the environment-perception system 204 to perform the techniques described herein.

The instructions 210 cause the radar system 102 and the environment-perception system 204 to act upon (e.g., create, receive, modify, delete, transmit, or display) data 212 (e.g., application data, module data; sensor data, or I/O data). Although shown as being within the respective computer-readable storage media 208, portions of the data 212 may be within a random-access memory (RAM) or a cache (not shown) of the radar system 102 and the environment-perception system 204. Furthermore, the instructions 210 and/or the data 212 may be remote to the radar system 102 and the environment-perception system 204.

The environment-perception system 204 is configured to provide downstream feedback to the radar system 102 for radar detection prioritization. The radar system 102 is configured to receive the downstream feedback from the environment-perception system 204 and use it to perform radar detection prioritization. In order to do so, the radar system 102 may contain or interface with a radar sensor (not shown), and the environment-perception system 204 may contain or interface with other types of sensors (e.g., lidar, imagers, lasers, or GNSS) that are not shown.

Example Data Flows

Figure 3:
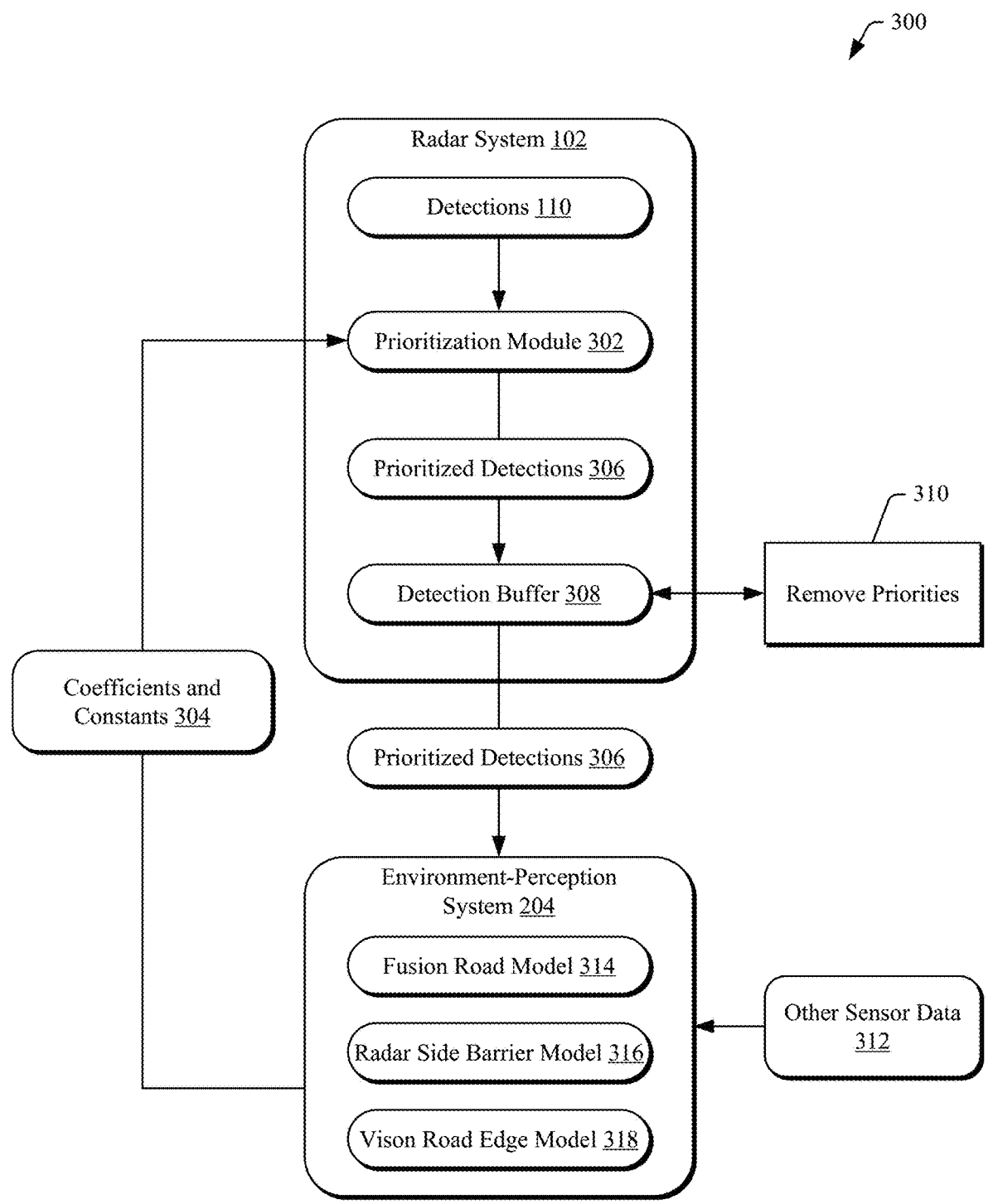
FIG. 3 is an example illustration of radar detection prioritization based on downstream feedback, in accordance with techniques of this disclosure.

FIG. 3 is an example illustration 300 of radar detection prioritization based on downstream feedback. The example illustration 300 shows aspects of the radar system 102 and the environment-perception system 204. Example illustration 300 further depicts data flows between the radar system 102 and the environment-perception system 204.

The radar system 102 contains a prioritization module 302 that receives the detections 110 and receives coefficients and constants 304 (e.g., downstream feedback) from the environment-perception system 204. The detections 110 are generally unfiltered, not prioritized, and may be determined by the radar system 102. The detections 110 have associated locations (e.g., Cartesian coordinates) relative to the vehicle 104 and velocities (e.g., range rates, relative velocities, or absolute velocities).

The prioritization module 302 uses the locations and the coefficients and constants 304 to determine prioritized detections 306, as will be discussed further in regard to FIG. 4. The prioritized detections 306 are any of the detections 110 that have been assigned a priority greater than zero. The prioritized detections 306 are placed, by the prioritization module 302, into a detection buffer 308.

The detection buffer 308 may be of various structures or types, including derivatives of buffer types, depending on application. As only one example, the detection buffer 308 may function as a first-in-first-out (FIFO) buffer, and overwrite detections that are oldest, before overwriting any more-recent detections to make space.

In some implementations, the prioritization module 302 may only prioritize the detections 110 responsive to determining that the detection buffer 308 is full. For example, if there is room in the detection buffer 308, the prioritization module 302 may not prioritize the detections or place all of the detections 110 (e.g., including the prioritized detections 306 and detections 110 that have been assigned a priority of zero) into the detection buffer 308. Furthermore, the prioritization module 302 may, at 310, remove priorities from the prioritized detections 306 that are within the detection buffer 308. For example, the prioritization module 302 may occasionally (e.g., periodically or in response to a hardware or software interrupt) remove the priorities to re-establish a baseline for generating the feedback. Doing so periodically (e.g. at regular intervals) keeps the detections 110 continuous.

The environment-perception system 204 is a downstream module (e.g., downstream function) from the radar system 102. That is, the environment-perception system 204 receives the prioritized detections 306 or pulls the prioritized detections 306 from the detection buffer 308. The environment-perception system 204 uses the prioritized detections 306 along with other sensor data 312 (e.g., lidar, camera, sonar, GNSS, or map data) to implement a fusion road model 314, a radar side barrier model 316, and a vision road edge model 318. The environment-perception system 204 may contain more models/functions than are shown/discussed herein. The non-shown models/functions may provide other functionalities that may, but do not necessarily, contribute to the coefficients and constants 304 for the prioritization of the detections 110.

The fusion road model 314 uses the other sensor data 312 (e.g., map data) and/or the prioritized detections 306 to determine a polynomial representation of the travel corridor 106 of the vehicle 104 in Cartesian coordinates according to Equation 1:

$$y = c_0^f + c_1 x + c_2 x^2 + c_3 x^3 \quad (1)$$

where x and y are Cartesian coordinates (e.g., x is left-right of the vehicle 104 and y is back-front of the vehicle 104 while traveling along the travel corridor 106). The coefficients $c_1$, $c_2$, and $c_3$ correspond to heading, curvature, and curvature rate, respectively, of the travel corridor 106, and the constant $c_0^f$ corresponds to an extent 108 of the travel corridor 106 (e.g., an edge of a roadway).

The radar side barrier model 316 uses the prioritized detections 306 to determine a constant $c_0^r$ that corresponds to an extent 108 of the travel corridor 106 (e.g., a guard rail, k-rail, or fence). The vision road edge model 318 uses the other sensor data 312 (e.g., camera data) to determine a constant $c_0^v$ that corresponds to an extent 108 of the travel corridor 106 (e.g., an edge of the pavement or concrete or foliage adjacent to the road).

Two or more of the constants $c_0^f$, $c_0^r$, and $c_0^v$ may correspond to a same extent 108. For example, a location of a guardrail may be represented by two of the constants (with slight differences based on the respective models).

The coefficients $c_1$, $c_2$, and $c_3$ and the constants $c_0^f$, $c_0^r$, and $c_0^v$ make up the coefficients and constants 304 that are fed back to the prioritization module 302 for use in prioritizing the detections 110. It should be noted that more or fewer of the described coefficients and constants 304 may be fed back or returned to the prioritization module 302. For example, not all of the constants may be available at any given time; thus, only one or two may be fed back. Furthermore, the three coefficients are indicative of a third-order polynomial representation of the travel corridor 106. In some implementations, a higher or lower order polynomial may be used. In such cases, more or fewer coefficients, respectively, would be fed back.

By using downstream feedback (e.g., the coefficients and constants 304 from the environment-perception system 204), the radar system 102 may store more relevant and prioritized detections (e.g., prioritized detections 306) in the detection buffer 308. In doing so, downstream functions (e.g., the environment-perception system 204) can be computationally optimized (e.g., by not acting upon every detection 110) and able to act upon relevant detections (e.g., prioritized detections 306) earlier. Furthermore, by only using coefficients and at least one constant (e.g., 4-6 numbers) as the feedback, computational and memory loads on both the environment-perception system 204 and the radar system 102 are minimized.

Figure 4:
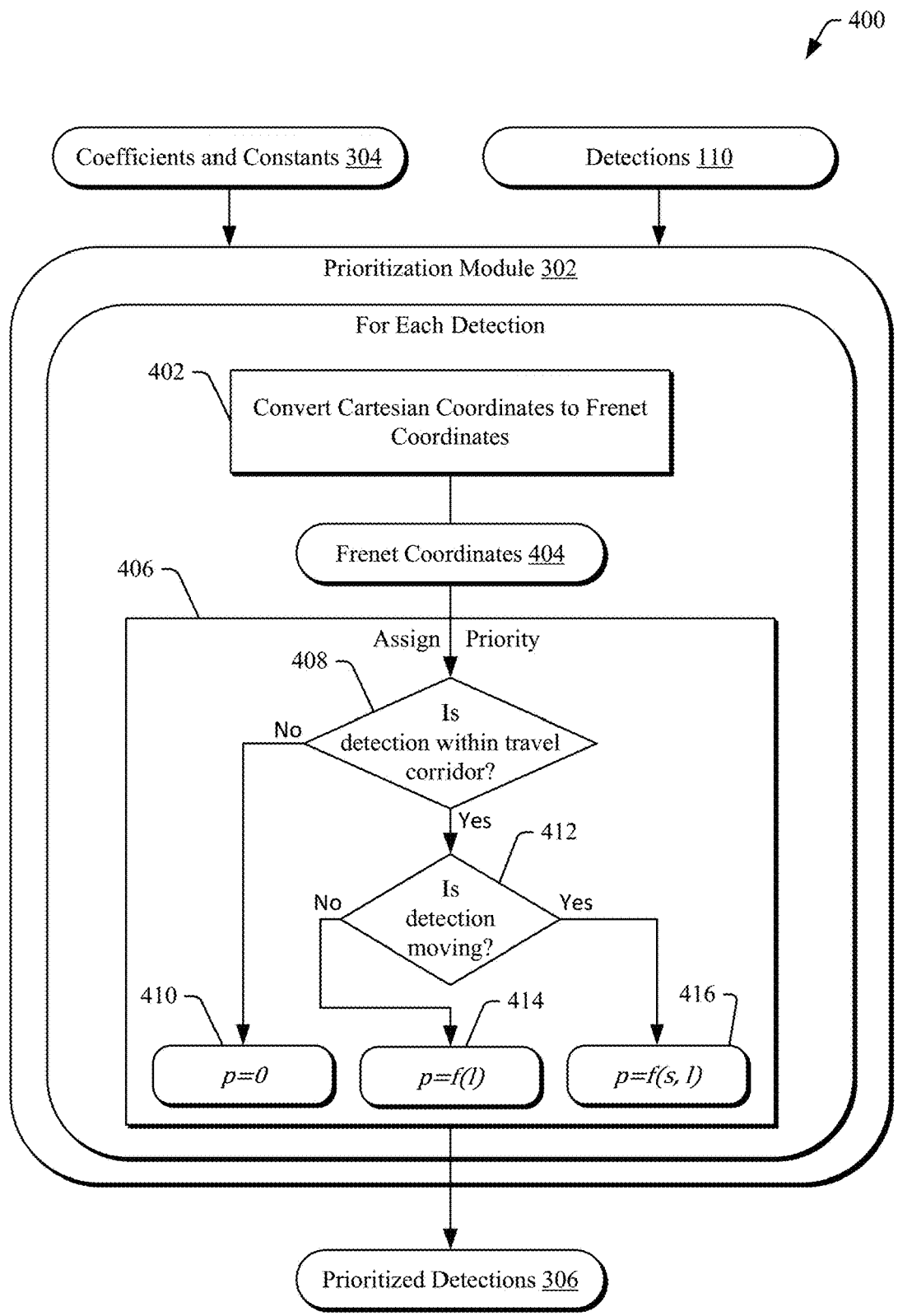
FIG. 4 is another example illustration of radar detection prioritization based on downstream feedback, in accordance with the techniques of this disclosure.

FIG. 4 is an example illustration 400 of radar detection prioritization based on downstream feedback. The example illustration 400 illustrates techniques performed by the prioritization module 302 to generate the prioritized detections 306 for storing within the detection buffer 308.

As discussed above, the prioritization module 302 receives the detections 110 and the coefficients and constants 304. The following is performed for each of the detections 110 (or for each of a subset of the detections 110).

At 402, the location of the detection 110 is converted from Cartesian coordinates to Frenet coordinates 404 according to Equations 2 and 3.

$$s = \int_0^x (1 + c_1 + 2c_2 x + 3c_3 x^2)^2 dx \quad (2)$$

$$l = -c_0^f + c_1 x + c_2 x^2 + c_3 x^3 \quad (3)$$

where s and l are the Frenet coordinates 404 of the detection 110 (e.g., l is left-right of the vehicle 104 and s is back-front of the vehicle 104), x is the Cartesian coordinate of the detection 110, and the coefficients and constant $c_0^f$ are those described above.

At 406, a priority is determined for the detection 110. In order to do so, the prioritization module 302 determines, at decision 408, if the detection 110 is within the travel corridor 106. Since the constants received from the environment-perception system 204 correspond to side extents of the roadway, the prioritization module 302 compares the l coordinate of the detection 110 with the constants $c_0^f$, $c_0^r$, and $c_0^v$. Again, not all of the constants may be received. If the l coordinate is outside of a minimum of the constants (e.g., if l is positive than greater than a minimum of the constants, and if l is negative than less than a negative minimum of the constants), then it is determined that the detection 110 is not within the travel corridor 106. In that case, the detection 110 is assigned a priority of zero, at 410. As such, the detection 110 does not become a prioritized detection 306.

If, however, it is determined at 408 that the detection 110 is within the travel corridor 106, the process proceeds to decision 412. At 412, the prioritization module 302 determines if the detection 110 is moving. In order to do so, the prioritization module 302 may compare a range-rate and azimuth angle of the detection 110 with a velocity of the vehicle 104. In some implementations, the detection 110 may already have an associated relative velocity, absolute velocity, and/or direction relative to the vehicle 104. If the detection 110 already has an associated absolute velocity, for example, then the prioritization module 302 may simply determine if it is above zero (e.g., moving).

If it is determined at 412 that the detection is not moving (e.g., it is stationary), then the prioritization module 302 may assign, at 414, a priority to the detection 110 based on Equation 4.

$$p = C\left[1 - \sqrt{\frac{|l|}{a_{minor}}}\right] \quad (4)$$

where p is the priority of the detection 110, C is a calibration constant, l is the Frenet coordinate 404 of the detection 110, and $a_{minor}$ is a sensor limit in the l direction.

If it is determined at 412 that the detection 110 is moving, then the prioritization module 302 may assign, at 416, a priority to the detection 110 based on Equation 5.

$$p = A + B\left[1 - \left(\frac{s^2}{a_{major}^2} + \frac{l^2}{a_{minor}^2}\right)\right] \quad (5)$$

where A and B are calibration constants with A+B=1 and A, B∈[0 1], s is the Frenet coordinate 404 of the detection 110, and $a_{major}$ is a sensor limit in the s direction.

Accordingly, the prioritization module 302 may assign a priority of zero to detections 110 that are outside of the travel corridor 106, a priority based on Equation 4 to detections 110 that are within the travel corridor 106 and stationary, and a priority based on Equation 5 to detections 110 that are within the travel corridor 106 and moving. As stated above, the detections with priorities greater than zero (e.g., the prioritized detections 306) can then be stored within the detection buffer 308. By using the coefficients and constants 304, the prioritization module 302 can filter the detections 110 (e.g., those with priorities of zero) and generate the prioritized detections 306 that get stored into the detection buffer 308 in a computationally efficient manner. Doing so enables the environment-perception system 204 to have access to an optimized detection buffer with the most relevant detections.

Example Method

Figure 5:
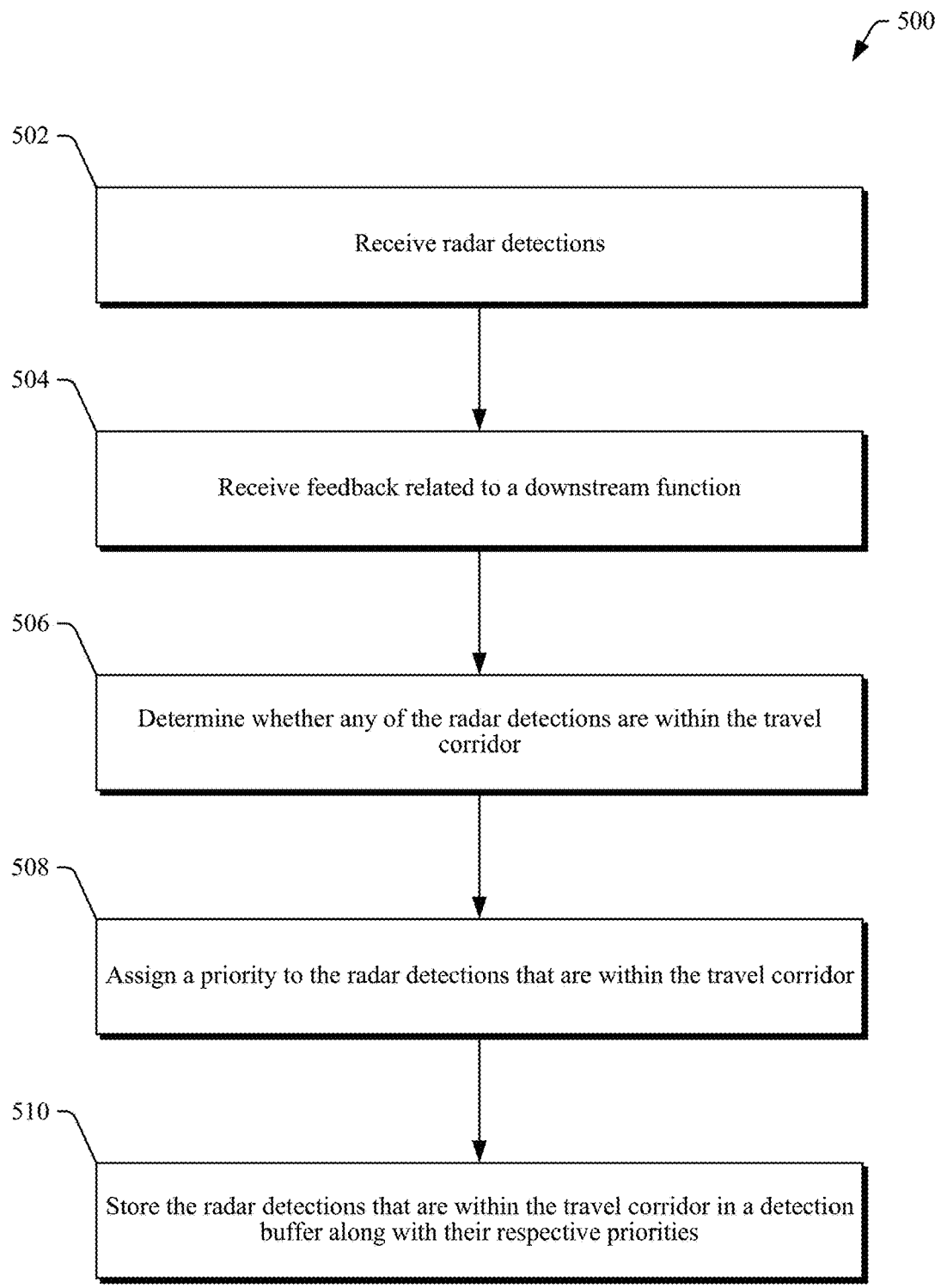
FIG. 5 is an example illustration of a method of radar detection prioritization based on downstream feedback, in accordance with the techniques of this disclosure.

FIG. 5 is an example illustration 500 of a method for radar detection prioritization based on downstream feedback. Example illustration 500 may be implemented utilizing the previously described examples, such as the example illustrations 100, 300, and 400 and the system 202. Operations 502 through 510 may be performed by one or more entities (e.g., the radar system 102 or other modules or components of the system 202). The order in which the operations are shown and/or described is not intended to be construed as a limitation, and any number or combination of the operations can be combined in any order to implement the method of example illustration 500 or an alternate method.

The example illustration 500 generally starts, at 502, by a processor of a vehicle receiving radar detections as the vehicle is traveling in a travel corridor. The radar detections correspond to objects (or portions thereof) proximate to the vehicle as the vehicle is traveling in the travel corridor and have corresponding locations relative to the vehicle. For example, the processor 206-1 of the radar system 102 may receive the detections 110 that correspond to objects 112.

At 504, feedback related to a downstream function is received from another processor of the vehicle that is executing the downstream function as the vehicle is traveling in the travel corridor. For example, the processor 206-1 of the radar system 102 may receive the coefficients and constants 304 from the processor 206-2 of the environment-perception system 204.

At 506, a determination is made as to whether any of the radar detections are within the travel corridor. As stated above, the radar detections have characteristics that are indicative of their respective objects. As such, the radar detections themselves may not be within the travel corridor, per se; rather, their corresponding objects (or portions thereof) may be within the travel corridor. For example, the prioritization module 302 may convert coordinates of the locations, if need be (e.g., at 402), and compare the locations of the detections 110 to the constants of the coefficients and constants 304 (e.g., at 408) to determine if the respective detections 110 are within the travel corridor 106.

At 508, for the radar detections that are within the travel corridor, a priority is assigned based on the locations and feedback. For example, the prioritization module 302 may prioritize the detections 110 that are within the travel corridor 106 at 414 if the respective detections 110 are stationary or at 416 if the respective detections 110 are moving.

At 510, the radar detections that are within the travel corridor are stored within a detection buffer along with their respective priorities. For example, the prioritization module 302 may store the prioritized detections 306 in the detection buffer 308.

By performing the above actions, the detection buffer is optimized while reducing computational loads on the prioritization function and the downstream function. Consequently, important detections may be recognized sooner, thereby improving safety and driver satisfaction.

EXAMPLES

Example 1: A method comprising: receiving, by a processor of a vehicle, radar detections as the vehicle is traveling in a travel corridor, the radar detections having associated locations relative to the vehicle; receiving, from another processor of the vehicle, feedback related to a downstream function executed by the other processor as the vehicle is traveling in the travel corridor; determining, based on the locations of the radar detections and the feedback related to the downstream function, whether any of the radar detections are within the travel corridor; and for at least one of the radar detections that is within the travel corridor: assigning, by the processor, a priority to the at least one of the radar detections, the priority being dependent on the locations of the at least one of the radar detections and the feedback related to the downstream function; and storing, by the processor, in a detection buffer, the at least one of the radar detections along with an indication of the assigned priority.

Example 2: The method of example 1, further comprising: determining, by the processor, whether the at least one of the radar detections is stationary, wherein assigning the priority to the at least one of the radar detections is based further on whether the at least one of the radar detections is stationary.

Example 3: The method of example 1 or 2, wherein assigning the priority to the at least one of the radar detections is based further on one or more radar sensor limits or one or more calibration constants.

Example 4: The method of any preceding example, wherein the travel corridor comprises a portion of a roadway that corresponds to a direction the vehicle is traveling.

Example 5: The method of any preceding example, further comprising, providing, by the processor, the at least one of the radar detections to the downstream function.

Example 6: The method of any preceding example, further comprising, for at least one of the radar detections that are not within the travel corridor, refraining from storing, in the detection buffer, the at least one of the radar detections that are not within the travel corridor.

Example 7: The method of any preceding example, further comprising removing, by the processor, the indication of the assigned priority from the at least one of the radar detections that are in the detection buffer after a predetermined time.

Example 8: The method of any preceding example: wherein the locations are received in Cartesian coordinates; further comprising converting, by the processor, the Cartesian coordinates to Frenet coordinates based on the feedback; and wherein assigning the priority to the at least one of the radar detections is based further on the Frenet coordinates of the at least one of the radar detections.

Example 9: The method of example 8, wherein the feedback comprises a plurality of coefficients and one or more constants.

Example 10: The method of example 9, wherein: the plurality of coefficients correspond to a polynomial representation of the travel corridor; the one or more constants correspond to lateral offsets that define extents of the travel corridor; the coefficients are used to convert the Cartesian coordinates to the Frenet coordinates; and the constants are used to determine whether any of the radar detections are within the travel corridor.

Example 11: A system configured to be implemented in a vehicle, the system comprising: a processor; computer-readable storage media comprising instructions that, when executed by the processor, cause the processor to: receive radar detections as the vehicle is traveling in a travel corridor, the radar detections having associated locations relative to the vehicle; receive from another processor of the vehicle, feedback related to a downstream function executed by the other processor as the vehicle is traveling in the travel corridor; determine, based on the locations of the radar detections and the feedback related to the downstream function, whether any of the radar detections are within the travel corridor; and for at least one of the radar detections that is within the travel corridor: assign a priority to the at least one of the radar detections, the priority being dependent on the locations of the at least one of the radar detections and the feedback related to the downstream function; and store, in a detection buffer, the at least one of the radar detections along with an indication of the assigned priority.

Example 12: The system of example 11, wherein: the instructions further cause the processor to determine whether the at least one of the radar detections is stationary; and assigning the priority to the at least one of the radar detections is based further on whether the at least one of the radar detections is stationary.

Example 13: The system of example 11 or 12, wherein assigning the priority to the at least one of the radar detections is based further on one or more radar sensor limits or one or more calibration constants.

Example 14: The system of any of examples 11-13, wherein the travel corridor comprises a portion of a roadway that corresponds to a direction the vehicle is traveling.

Example 15: The system of any of examples 11-14, wherein the instructions further cause the processor to provide the at least one of the radar detections to the downstream function.

Example 16: The system of any of examples 11-15, wherein the instructions further cause the processor to, for at least one of the radar detections that are not within the travel corridor, refrain from storing, in the detection buffer, the at least one of the radar detections that is not within the travel corridor.

Example 17: The system of any of examples 11-16, wherein the instructions further cause the processor to remove the indication of the assigned priority from the at least one of the radar detections that are in the detection buffer after a predetermined time.

Example 18: The system of any of examples 11-17, wherein: the locations are received in Cartesian coordinates; the instructions further cause the processor to convert the Cartesian coordinates to Frenet coordinates based on the feedback; and assigning the priority to the at least one of the radar detections is based further on the Frenet coordinates of the at least one of the radar detections.

Example 19: The system of example 18, wherein the feedback comprises a plurality of coefficients and one or more constants.

Example 20: The system of example 19, wherein: the plurality of coefficients correspond to a polynomial representation of the travel corridor; the one or more constants correspond to lateral offsets that define extents of the travel corridor; the coefficients are used to convert the Cartesian coordinates to the Frenet coordinates; and the constants are used to determine whether any of the radar detections are within the travel corridor.

Although implementations of radar detection prioritization based on downstream feedback have been described in language specific to certain features and/or methods, the subject of the appended claims is not necessarily limited to the specific features or methods described. Rather, the specific features and methods are disclosed as example implementations for radar detection prioritization based on downstream feedback. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
receiving, by a processor of a vehicle, radar detections as the vehicle is traveling in a travel corridor, the radar detections having associated locations relative to the vehicle;
receiving, from another processor of the vehicle, feedback related to a downstream function executed by the other processor as the vehicle is traveling in the travel corridor;
determining, based on the locations of the radar detections and the feedback related to the downstream function, whether any of the radar detections are within the travel corridor; and
for at least one of the radar detections that are within the travel corridor:
assigning, by the processor, a priority to the respective radar detection based on at least one Frenet coordinate of the respective radar detection; and
storing, by the processor, in a detection buffer, the respective radar detection along with an indication of the assigned priority; and
providing the at least one of the radar detections along with the respective indications of assigned priority to the downstream function.

2. The method of claim 1, further comprising:
determining, by the processor, whether the respective radar detection is stationary,
wherein assigning the priority to the respective radar detection is based further on whether the respective radar detection is stationary.

3. The method of claim 1, wherein assigning the priority to the respective radar detection is based further on one or more radar sensor limits or one or more calibration constants.

4. The method of claim 1, wherein the travel corridor comprises a portion of a roadway that corresponds to a direction the vehicle is traveling.

5. The method of claim 1, further comprising, for at least one of the radar detections that are not within the travel corridor, refraining from storing, in the detection buffer, the at least one of the radar detections that are not within the travel corridor.

6. The method of claim 1, further comprising removing, by the processor, the indications of the assigned priority from the radar detections that are in the detection buffer after a predetermined time.

7. The method of claim 1:
wherein the locations are received in Cartesian coordinates;
further comprising converting, by the processor, the Cartesian coordinates to Frenet coordinates based on the feedback.

8. The method of claim 7, wherein the feedback comprises a plurality of coefficients and one or more constants.

9. The method of claim 8, wherein:
the plurality of coefficients correspond to a polynomial representation of the travel corridor;
the one or more constants correspond to lateral offsets that define extents of the travel corridor;
the coefficients are used to convert the Cartesian coordinates to the Frenet coordinates; and
the constants are used to determine whether any of the radar detections are within the travel corridor.

10. A system configured to be implemented in a vehicle, the system comprising:
a processor;
computer-readable storage media comprising instructions that, when executed by the processor, cause the processor to:
receive radar detections as the vehicle is traveling in a travel corridor, the radar detections having associated locations relative to the vehicle;
receive from another processor of the vehicle, feedback related to a downstream function executed by the other processor as the vehicle is traveling in the travel corridor;
determine, based on the locations of the radar detections and the feedback related to the downstream function, whether any of the radar detections are within the travel corridor; and
for at least one of the radar detections that are within the travel corridor:
assign a priority to the respective radar detection based on at least one Frenet coordinate of the respective radar detection; and
store, in a detection buffer, the respective radar detection along with an indication of the assigned priority; and
provide the at least one of the radar detections along with the respective indications of assigned priority to the downstream function.

11. The system of claim 10, wherein:
the instructions further cause the processor to determine whether the respective radar detection is stationary; and
assigning the priority to the respective radar detection is based further on whether the respective radar detection is stationary.

12. The system of claim 10, wherein assigning the priority to the respective radar detection is based further on one or more radar sensor limits or one or more calibration constants.

13. The system of claim 10, wherein the travel corridor comprises a portion of a roadway that corresponds to a direction the vehicle is traveling.

14. The system of claim 10, wherein the instructions further cause the processor to, for at least one of the radar detections that are not within the travel corridor, refrain from storing, in the detection buffer, the at least one of the radar detections that is not within the travel corridor.

15. The system of claim 10, wherein the instructions further cause the processor to remove the indications of the assigned priority from the radar detections that are in the detection buffer after a predetermined time.

16. The system of claim 10, wherein:
the locations are received in Cartesian coordinates;
the instructions further cause the processor to convert the Cartesian coordinates to Frenet coordinates based on the feedback.

17. The system of claim 16, wherein the feedback comprises a plurality of coefficients and one or more constants.

18. The system of claim 17, wherein:
the plurality of coefficients correspond to a polynomial representation of the travel corridor;
the one or more constants correspond to lateral offsets that define extents of the travel corridor;

the coefficients are used to convert the Cartesian coordinates to the Frenet coordinates; and the constants are used to determine whether any of the radar detections are within the travel corridor.

19. The method of claim 2, wherein assigning the priority to the respective radar detection comprises selecting an equation for calculating the priority from a plurality of equations based on whether the respective radar detection is stationary.

20. The system of claim 11, wherein assigning the priority to the respective radar detection comprises selecting an equation for calculating the priority from a plurality of equations based on whether the respective radar detection is stationary.

* * * * *